United States Patent [19]
McKinley
[11] 3,795,013
[45] Feb. 26, 1974

[54] RECORDING SYSTEM HAVING DIGITAL CONTROL FOR CONTROLLING RECORDING MEDIUM MOVEMENT

[75] Inventor: Richard Eugene McKinley, Englewood, Colo.

[73] Assignee: Honeywell Inc., Minneapolis, Minn.

[22] Filed: Oct. 13, 1972

[21] Appl. No.: 297,261

[52] U.S. Cl. ................ 346/136, 178/6.7 R, 226/33, 318/603, 346/110
[51] Int. Cl. .......................................... G01d 15/24
[58] Field of Search.... 346/136, 110; 226/134, 135, 226/132, 33, 9; 318/603; 178/6.7 R, 6.7 A, 7.4

[56] References Cited
UNITED STATES PATENTS 3,590,150 6/1971 McMahon...................... 346/110 X
3,609,225 9/1971 Stallard........................... 178/6.7 R

*Primary Examiner*—Joseph W. Hartary
*Attorney, Agent, or Firm*—Arthur H. Swanson; Lockwood D. Burton; M. J. Halista

[57] ABSTRACT

A digital control for a recording system to provide incremental lengths of a recording medium between recordings of an input signal using digital counters to count signals representative of the passage of incremental lengths of the recording medium to either control the blanking and unblanking of a cathode ray tube used to record on the recording medium along a horizontal sweep action recording line or to control the motion of the recording medium after the termination of a recording operation.

10 Claims, 1 Drawing Figure

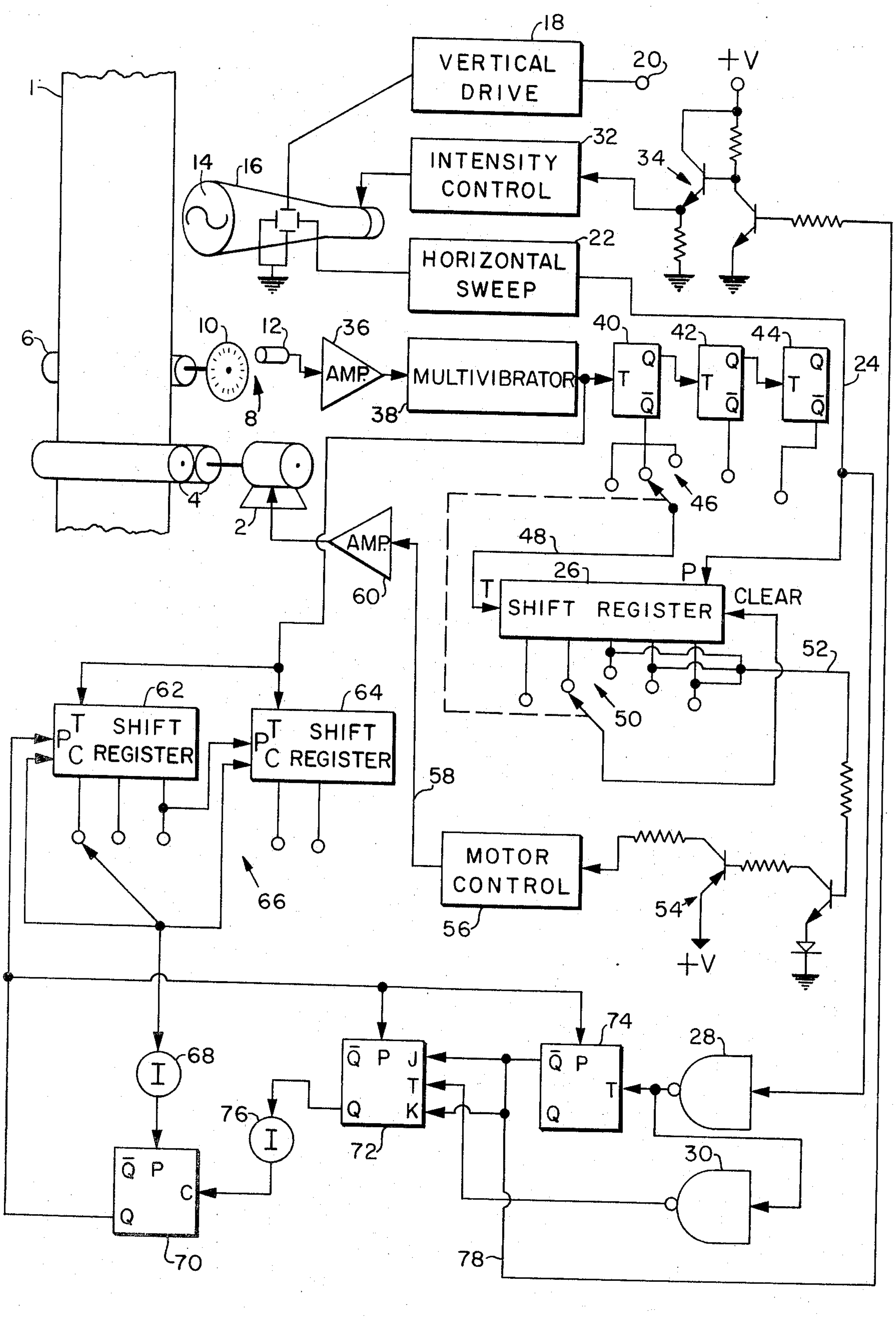
VERTICAL DRIVE
INTENSITY CONTROL
HORIZONTAL SWEEP
AMP.
MULTIVIBRATOR
SHIFT REGISTER
CLEAR
AMP.
SHIFT REGISTER
SHIFT REGISTER
MOTOR CONTROL
+V
+V

RECORDING SYSTEM HAVING DIGITAL CONTROL FOR CONTROLLING RECORDING MEDIUM MOVEMENT

The present invention relates to recording systems. More specifically, the present invention is directed to a recording system having a digital control for controlling the movement of a recording medium.

An object of the present invention is to provide an improved recording system having a digital control for selectively advancing incremental lengths of a recording medium.

Another object of the present invention is to provide an improved digital control for selectively advancing a recording medium in preselected incremental lengths between recordings.

SUMMARY OF THE INVENTION

In accomplishing these and other objects, there has been presented, in accordance with the present invention, a recording system having a digital control for advancing a recording medium between recordings thereon to produce predetermined incremental lengths of a recording medium between the recordings using a first digital counter to produce an output signal representative of the passage of incremental lengths of the recording medium by a motion sensor arranged to sense the passage of the recording medium and means for selecting a count from the counter representative of the passage of a desired incremental length of the recording medium to control the energization of the drive means for the recording medium. The counter is arranged to be enabled by a signal representative of the end of a recording cycle. A second counter is provided for counting the incremental lengths of the recording medium after the end of a recording cycle to control the recording of an input signal on the recording medium during selected recording cycles occurring at repetitive locations along the recording medium.

BRIEF DESCRIPTION OF THE DRAWING

A better understanding of the present invention may be had when the following detailed description is read in connection with the accompanying single FIGURE drawing which is a block diagram of a recording system embodying the present invention.

DETAILED DESCRIPTION

Referring to the single FIGURE drawing in more detail, there is shown a recording medium 1 arranged to be transported by any suitable means (not shown) and driven by a drive motor 2 driving one of a pair of drive rollers 4. The recording medium 1 is arranged to pass over a roller 6 attached to a paper motion sensing means 8 which may be any suitable device, such as a premarked disc 10 and a sensor 12 arranged to sense the indicia on the disc 10. The recording medium 1 is provided with a sensitized recording surface which is transported past a display face 14 of a cathode-ray tube 16. The cathode-ray tube 16, is arranged with a conventional electron beam deflection system, e.g., an electrostatic system using a pair of so-called horizontal deflection plates and a pair of vertical deflection plates. A vertical drive means 18 is connected to a source of input signals to be displayed on the display face 14 by means of an input terminal 20. The vertical drive means 18 is connected in a conventional manner to the vertical deflection plates of the cathode-ray tube 16. A horizontal sweep means 22 is connected to the horizontal deflection plates in the cathode-ray tube 16 to produce a horizontal sweep of the electron beam in the cathode-ray tube 16 by means of a horizontal sweep signal. The horizontal sweep means may be operated to produce either a continuously recurring horizontal sweep by means of a repetitive horizontal sweep signal or a triggered horizontal sweep occurring only upon the presence of a trigger signal, e.g., an input signal applied to the input terminal 20. These operations of the horizontal sweep means 22 are well-known in the art and may be effected by any suitable prior art circuit (not shown). Additionally, a signal is obtained from the horizontal sweep means 22 representative of the occurrence of a horizontal sweep signal and is applied by means of a signal line 24 to preset input terminal of a shift register 26 and to the input circuit of NAND gate 28 of a pair of NAND gates 28 and 30. An intensity control 32 is connected to the cathode-ray tube 16 to turn the electron beam on and off, i.e., unblank and blank the display on the display face, in response to an output signal from an amplifier circuit 34 having an input signal as discussed hereinafter.

An output signal from the transducer 12 sensing the code wheel 10 is amplified by an amplifier 36 and is applied to the input of a multivibrator circuit 38. An output signal from the multivibrator circuit 38 is applied to the "clock" input terminal of a first bistable device, e.g., a flip-flop 40. An output signal from the logical 1 side of the flip-flop 40 is applied to the clock input terminal of a second flip-flop 42 and an output signal from the logical 1 side of the second flip-flop 42 is applied to the clock input terminal of a third flip-flop 44. An output signal from the logical 0 side of the flip-flop 40 is applied to the first, second and third stationary contacts of a single pole five position rotary switch 46. An output signal from the logical 0 side of the second flip flop 42 is applied to the fourth stationary contact of the switch 46 and an output signal from the logical 0 side of the third flip-flop 44 is applied to the fifth stationary contact of the rotary switch 46. An output line 48 is connected between the electrically conductive movable arm of the switch 46 and a clock input terminal of the shift register 26. The shift register 26 is a five bit shift register having a first stage connected to a first stationary contact of a second rotary switch 50. A second stage of the shift register 26 is connected to a second stationary contact of the switch 50 and the third, fourth and fifth of the shift register 26 are connected to the third, fourth and fifth contacts of the rotary switch 50, respectively. The third, fourth and fifth contacts of the rotary switch 50 are connected to a common output line 52 to apply an input signal to an amplifying means 54. An output signal from the amplifying means 54 is connected to a motor control means 56 to control an output signal from the motor control means 56 applied to an output line 58. This output signal on line 58 is amplified by an amplifier 60 and is applied to the motor means 2 to control the movement of the recording medium 1.

The output signal from the multivibrator 38 is also applied to the clock input terminals to a pair of five bit shift registers 62 and 64. A first stage of the shift register 62 is connected to a first stationary contact of a third rotary switch means 66. Similarly, the second and third stages of the shift register 62 are connected to the second and third stationary contacts of the rotary switch 66, respectively. The first and second stages of the shift reigster 64 are connected to the fourth and fifth stationary contacts of the switch 66, respectively. A moveable electrically conductive arm of the switch means 66 is connected to the "clear" input terminals of the shift registers 62 and 64 and to a logical signal inverter means 68. An output signal from the logical inverter means 68 is applied to the "preset" input terminal of a flip-flop 70. An output signal from the logical 1 output terminal of the flip-flop 70 is applied to a preset input of the shift register 62 and a preset input of each of a pair of flip-flops 72 and 74. An output signal from the logical 1 side of the flip-flop 72 is applied through a logical inverter 76 to the clear input terminal of the flip-flop 70. The J and K input terminals of the flip-flop 72 are connected together and are arranged to be driven by an output signal from the logical 0 side of the flip-flop 74. The output signal from the logical 0 side of the flip-flop 74 is also applied to a signal line 78 connected to the input of the amplifier 34, which as previously discussed. is effective to produce an output signal to control the intensity control 32 for blanking and unblanking the cathode-ray tube 16. The clock input terminal T of the flip-flop 74 is connected to the output of the NAND gate 28 while the clock input of the flip-flop 72 is connected to the output of the NAND gate 30 having its input connected to the output of the NAND gate 28. Specifically, the output signal of the NAND gate 28 is connected to the clock input terminal of the flip-flop 74 while the output signal of the NAND gate 30 is connected to the clock input terminal of the flip-flop 72.

The operation of the control circuit shown in the single FIGURE drawing is divided between a record overrun and a sweep spacing function. The record overrun function is controlled by the flip-flops 40, 42 and 44 and the shift register 26. The switches 46 and 50 are ganged together and may be separate decks of a two pole, five position switch. The first deck of this switch shown as switch 46 is connected to the three flip-flops 40, 42 and 44 while the second deck of the switch shown as switch 50 is connected to the five bit counter 26. The contacts of the switches 46 and 50 are used to represent, respectively, one, two, four, eight and 16 divisions on the code wheel 10 corresponding to similar increments of movement of the recording medium 1. The one, two, and four divisions of the first switch 46 are tied together and are representative of the same output of the first flip-flop 40 which is effective to produce one output pulse for every division on the code wheel 10 inasmuch as it fed directly from the code wheel 10 through the amplifier 36 and multivibrator 38. The second flip-flop 42 produces an output pulse for every two divisions of paper movement which signal is applied to the fourth, or eight division, terminal of the switch 46 while the third flip-flop 44 produces an output pulse for every four divisions of paper movement which output signal is applied to the fifth, or sixteen division, terminal of the switch 46. Similarly, the second switch 50 is connected to the shift register 26 with the first, second and third, or one, two, and four division, contacts of the switch 50 being connected to the first, second and third stages of the counter 26, respectively, while the eight and 16 division, or fourth and fifth, contacts of the switch 50 are tied to the four division, or third, contact of the switch 50. Thus, the ganged operation of the switches 46 and 50 is effective to select different counts of the divisions on the code wheel 10. Specifically, the operation of the first switch 46 through the first three positions thereof provides the same output of the first flip-flop 40 while the same three positions of the ganged switch 50 provides three different outputs of the shift register or counter 26. On the other hand, the last two positions of the switch 46 provide different output signals from the second and third flip-flops 42 and 44, respectively, while the last two positions of the switch 50 are tied to the third stage of the counter 26 to provide the same output signal.

MODE OF OPERATIONS

These flip-flops 40, 42 and 44 and the counter 26 are initially set by any suitable means (not shown) to an initial state wherein all the outputs of the counter 26 are in a logical 0 state while the flip-flops 42, and 44 are to a logical 0 state. After this initializing operation, the switches 46 and 50 are set to meet a desired record overrun operation is represented by the code wheel divisions to be counted before the recording medium 1 is stopped. When a horizontal sweep representative signal from the horizontal sweep control 22 is applied on line 24 to the preset input of the counter 26 the counter 26 is preset to a logical 1 state on all its output terminals which output state is applied over line 52 through amplifier 54 to the motor control 56. This output signal from the counter 26 is arranged to turn on the motor control 56 whereby an output signal is applied on line 58 to the amplifier 60 to actuate the recording medium drive motor 2. As soon as the recording medium 1 is moving over the roller 6, the divisions on the code wheel 10 are sensed by the senser 12 and the resulting pulses are applied through the amplifier 36 to the multivibrator 38 to produce drive signals for the clock input of the first flip-flop 40. If the positions of the switches 46 and 50 are set as shown in the accompanying illustration, the output signals from the first flip-flop 40 representing each division of the code wheel 10 are applied to the shift register 26 to produce a count of these pulses by the shift register 26. Since the movable arm, or output contact of the second switch 50 in the illustrated position is set on the second switch terminal which is connected to the second count stage of teh counter 26, an output signal from the switch 50 is finally obtained after a count of two code wheel divisions by the first flip-flop 40. This output signal is applied to the clear input terminal of the counter 26 to produce a logical 0 state on all of the output terminals of the counter 26. This logical 0 state is applied over line 52 to amplifier 54 to produce a signal to turn-off the motor control 56 whereby the motor 2 is de-energized to stop the motion of the recording medium 1. Thus, a desired length, e.g., two incremental lengths, of the recording medium 1 is driven past the recording line where the horizontal sweep signal, i.e., the recording on the recording medium 1, has occurred. If another horizontal sweep signal occurs prior to the clearing of the counter 26, the counter 26 is reset by a signal applied on the line 24 and the aforesaid count cycle is started again with the motor control 56 retaining the motor 2 in an energized state. Thus, the record overrun function enables the recorder to make a recording of the signals appearing on the display face 14 of the cathode-ray tube 16 for every horizontal sweep signal produced by the horizontal sweep control means 22 which is selectively operated by the presence of an input signal to be recorded and to initiate and to continue the motion of the recording medium 1 past the recording position of the cathode-ray tube 16 for a predetermined number of incremental lengths of the recording medium 1.

On the other hand, the sweep spacing function provides an inhibit operation for the recording by the cathode-ray tube 16 to inhibit the recording of a predetermined number of horizontal recording sweeps across the display face 14 produced by the horizontal sweep control means 22. Consequently, a recording can be produced on a respective recording line for every horizontal sweep generated by the horizontal sweep control means 22 or some of the horizontal sweep recordings may be selectively omitted with the number of omitted sweeps being predetermined by the operation of the switch 66. In order to determine the spacing of the recorded sweeps, the code wheel 10 and sensor 12 are used to produce signals representative of the incremental lengths of the recording medium 1 passing the cathode-ray tube 16 under control of the motor drive circuit described above. The output signals from the multivibrator 38, as described above for use with the overrun control circuit, is, also applied to the clock inputs of the pair of five bit shift registers 62 and 64. The intensity control 32 may be initially set to blank, i.e., deenergize, the display on the cathode-ray tube 16 by introducing a preset state of the shift registors 62 and 64 and the flip-flops 72 and 74 by any suitable means (not shown) whereby the shift registors 62 and 64 are initially set to produce a logical 1 state on all of their output terminals and the flip-flops 72 and 74 are preset to produce a logical 0 state from the flip-flop 74 and a logical 1 state from the flip-flop 72.

Specifically, a preset signal can be applied to the preset input terminal of the first shift register 62 whereby all of its output stages are in a logical 1 state. Since one of these output signals is also applied to the preset input of the second shift registor 64, it is effective to preset all of the outputs of the second shift registor 64 into a logical 1 state. Similarly, applying a preset signal to a preset input terminal of the flip-flop 72 and 74 is effective to set these flip-flops into a logical 1 state. However, the output signal for controlling the intensity control 32 is taken over line 78 from the logical 0 state of the flip-flop 74 which state is inverted by the amplifier 34 and applied to the intensity control 32 to produce a blanking of the cathode-ray tube 16.

Concurrently, the start of a horizontal sweep signal is applied from the horizontal sweep control 22 through NAND gate 28 to the clock input terminal of the flip-flop 74 to reverse its logical state whereby the signal applied on line 78 is now a logical 1. At the end of the horizontal sweep signal, the output signal from the horizontal sweep control means 22 is applied through the first NAND gate 28 and the second NAND gate 30 to the clock input terminal of the flip-flop 72. The double logical inversion performed by the NAND gates 28 and 30 is effective to produce a signal for changing the state of the flip-flop 72. This change in state of the flip-flop 72 is applied through the inverter 76 to the clear input of the flip-flop 70 to produce a logical 1 state on the output from the flip-flop 70 which is connected to the shift registers 62 and 64 and the flip-flops 72 and 74. Assuming the flip-flop 70 was in a logical 1 state, the input from the inverter 76 is effective to change this to a logical 0 state. This output signal from the flip-flop 70 is applied to the preset input terminal of the first shift register 62 which presets the shift register 62 to a logical 0 state on all of its output signal terminals which, in turn, is effective to preset shift register 64 to a logical 0 state on all of its output signal terminals. Further, the logical 0 state from the flip-flop 70 is applied to the preset input terminals of the flip-flops 72 and 74 to produce a logical state for maintaining the blanked condition of the cathode-ray tube 16 following the end of the horizontal sweep signal. This blanked state of the cathode-ray tube 16 is maintained for the predetermined number of incremental lengths of the recording medium 1 which are desired between the recordings of the input signal. Thus, regardless of the occurrence of another horizontal sweep signal by the horizontal sweep control means 22, the application of the preset signal to the flip-flops 72 and 74 prevents these flip-flops from changing state in response to an output signal on line 24 from the horizontal sweep control means 22 whereby the blanked state of the cathode-ray tube 16 is maintained. This situation is continued until the shift registers 62 and 64 have counted the desired number of incremental lengths of the recording medium 1 represented by output signals from the multivibrator 38. Assuming the switch 66 is in the position illustrated in the drawing, an output signal from the first shift register 62 is applied through the inverter 38 to the flip-flop 70 upon a count of one incremental length of the recording medium 1. The output signal from the flip-flop 70 is, accordingly, changed to a logical 1 state which is effective to preset the shift registers 62 and 64 and to release the flip-flops 72 and 74 from a forced condition imposed by the previously applied logical 1. Thus, the flip-flops 72 and 74 are now conditioned to receive the output signal from the horizontal sweep control means 22 representative of the start of another horizontal sweep which is effective, as previously discussed, to unblank the intensity control means 34 to produce a recording on the recording medium 1.

Accordingly, it may be seen that there has been provided a recording system for producing predetermined incremental lengths movements of a recording medium between recordings of an input signal on the recording medium.

The embodiments of the invention in which an exclusive property or privilege is claimed are defined as follows:

1. A recording system for recording on a recording medium comprising:

means for recording on the recording medium along a recording line defined by said means for recording and for producing a passage of a succession incremental lengths of the recording medium past said recording line following the recording on the recording medium, means for detecting the passage of the recording medium past said means for recording to produce a series of output signals with each signal being representative of the passage of an incremental length of said recording medium past said means for recording, counting means connected to said means for detecting for counting said output signals representative of the passage of incremental lengths of the recording medium, control means connected to said means for counting and being responsive to a selectively variable count in said counting means for producing a control signal for said means for recording, and circuit means for applying said control signal to said means for recording to produce a predetermined incremental length movement of the recording medium between recordings by said means for recording.

2. A recording system as set forth in claim 1 wherein said means for recording includes motor means arranged to drive said recording medium past said means for recording and said last-mentioned means includes means for selectively applying said control signal as an energizing signal to said motor means.

3. A recording system as set forth in claim 1 wherein said recording means includes means for generating a signal representative of a recording cycle and including means for applying said signal representative of a recording cycle to said counting means to reset said counting means at the end of a recording cycle.

4. A recording system as set forth in claim 1 wherein said means for recording includes recording intensity control means having a bi-stable mode of operation between a record producing and a recording inhibiting state, and including a second counting means for counting said output signals and circuit means connected between said second counting means and said recording intensity control means to produce a first mode of operation of said recording intensity control means during a first predetermined count by said second counting means and a second mode of operation of said recording intensity control means during a second predetermined count by said second counting means.

5. A recording system as set forth in claim 1 wherein said said counting means means includes a digital counter means arranged to produce an output signal upon the attainment of a predetermined count.

6. A recording system as set forth in claim 4 wherein said second counting means includes a digitial counter means arranged to produce an output signal upon the attainment of a predetermined count.

7. A recording system as set forth in claim 6 wherein said first-mentioned counting means includes a digital counter means arranged to produce an output signal upon the attainment of a predetermined count.

8. A recording system as set forth in claim 4 wherein said recording means includes means for generating a signal representative of a recording cycle and including means for applying said signal representative of a recording cycle to said first-mentioned counting means and said second counting means to reset both counting means at the end of a recording cycle.

9. A recording system as set forth in claim 4 wherein said means for recording includes motor means arranged to drive the recording medium past said means for recording and said control signal is applied as an energizing signal to said motor means.

10. A recording system as set forth in claim 9 wherein said means for detecting includes a roller in contact with the recording medium, a code wheel attached to said roller to be rotatably driven thereby and means for sensing the passage of said code wheel past said means for sensing.

* * * * *